July 19, 1949.    P. E. CHOLET    2,476,835
RESILIENT WHEEL

Filed March 14, 1946    3 Sheets-Sheet 1

INVENTOR.
PROSPER E CHOLET
BY
ATTORNEYS

July 19, 1949.  P. E. CHOLET  2,476,835
RESILIENT WHEEL
Filed March 14, 1946  3 Sheets-Sheet 2
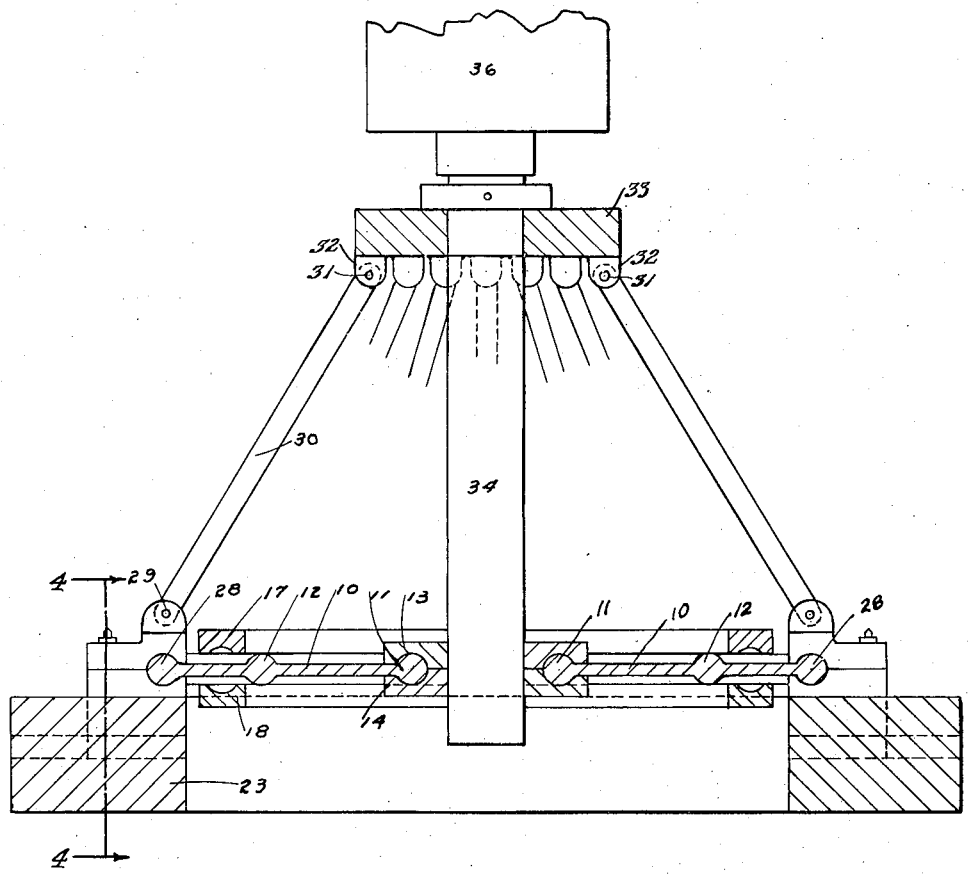
Fig 3
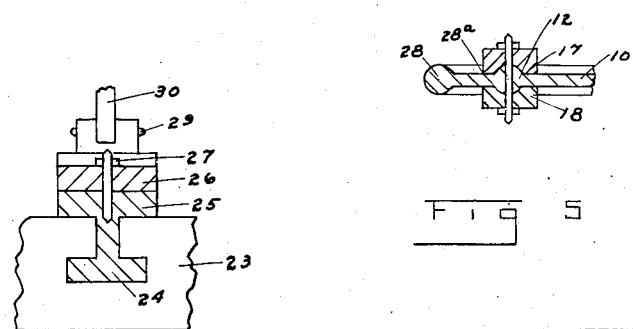
Fig 4
Fig 5
INVENTOR.
PROSPER E. CHOLET
BY
ATTORNEYS July 19, 1949.  P. E. CHOLET  2,476,835
RESILIENT WHEEL
Filed March 14, 1946  3 Sheets-Sheet 3
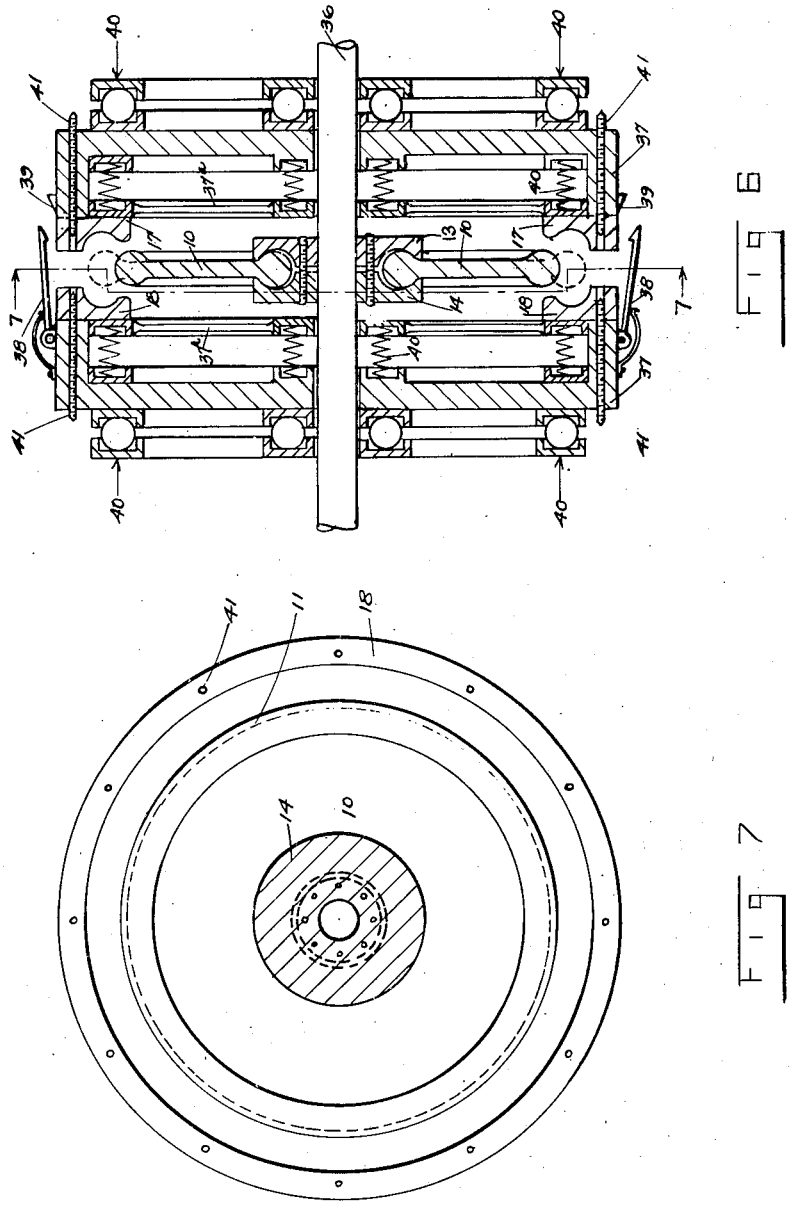
INVENTOR.
PROSPER E. CHOLET
BY
ATTORNEYS.

Patented July 19, 1949

2,476,835

UNITED STATES PATENT OFFICE 2,476,835

RESILIENT WHEEL

Prosper E. Cholet, New Brunswick, N. J.

Application March 14, 1946, Serial No. 654,311

4 Claims. (Cl. 152—47)

1

This invention relates to resilient wheels and has for an object the production of an article that can be used for a variety of purposes, among which are wheels as hereinafter described, the sides of wire and cable reels and the like, the sides of film spools, diaphragms for use in various kinds of apparatus such as pumps, valves and the like. The article can also be used for one of the members in transmission clutches and in fact wherever a disc is to be employed.

Another object of the invention is to provide a wheel particularly adapted for wheel vehicles and the like, including airplane wheels. Other objects and advantages of the invention will more fully hereafter appear.

The accompanying drawings illustrate two forms of apparatus suitable for making the wheel described herein. By way of illustration the invention is described as applied to a wheel. It will be understood, however, that the description and drawings are merely illustrative and not limitative of the invention, for once the inventive concept is understood, wide variations can be made in the wheel which is as defined in the appendant claims.

In the accompanying drawings:

Fig. 3 is a diagram of a machine that may be used to produce the article of manufacture described herein.

Fig. 4 is a view on the line 4, 4, Fig. 3.

Fig. 5 is a diagram showing how the annular resilient flange is stretched or tensioned by the apparatus shown in Fig. 3.

Fig. 6 is a view of an alternate form of an apparatus that can be used similar to that shown in Fig. 3 to tension the annular resilient flange or web and assemble the rigid annular members thereto.

Fig. 7 is a view partly in section of the article of manufacture produced by the apparatus shown in Fig. 6.

Figure 1:
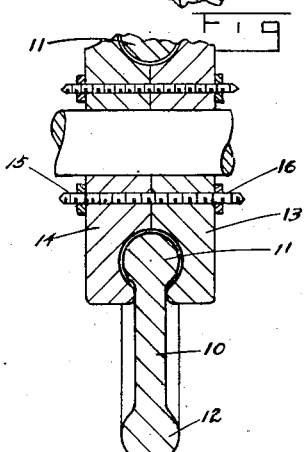
Figure 1 is a view partly in section of the article of manufacture before the annular elastic web therein is tensioned and secured to the outer rigid member or rim.

The main inventive concept herein disclosed is that of providing an article of manufacture comprising an annular elastic web having rigid annular members secured to the inner and outer peripheries of said web, the latter being held under radial tension between said members. Referring to Fig. 1 the numeral 10 denotes such an annular elastic web which may be made of any suitable material such as rubber having the necessary elastic properties so that the web may be expanded or tensioned as hereinafter described.

The body of the web 10 lying between the inner and outer edges thereof may be of any suitable cross-section depending on the use to which the device is to be put, for example, the web may be concave in cross-section, or convex or may take any other suitable form.

The inner annular periphery of the web 10 terminates in an enlarged portion indicated by the numeral 11, and the outer annular periphery of the web terminates in the enlarged portion indicated by the numeral 12. These enlarged portions may be of circular cross-section as shown, or of any other suitable formation so as to be tightly gripped and held in the rigid annular members to be presently described.

The inner rigid annular member, which is secured to the inner periphery of the web, is indicated at 13, 14, and may form in the case of a wheel the hub thereof. This member, therefore, may comprise two annular flat members having arcuate depressions in their inner surfaces to receive the inner edge 11 of the web, and these members may be bolted or otherwise secured together by a plurality of bolts 15, or in any other suitable manner, such as by rivets, in which case the nuts 16 may be omitted.

Instead of forming the inner member in two parts as shown at 13 and 14, the inner member may comprise a circular ring or flange or U-shaped formation, which can be placed over the inner edge 11 and then the open ends of the U can be bent down round the edge 11 so as to grip same.

The means for attaching both the inner and outer rigid members to the web is immaterial, as long as they are securely fastened to the inner and outer edges thereof.

Figure 2:
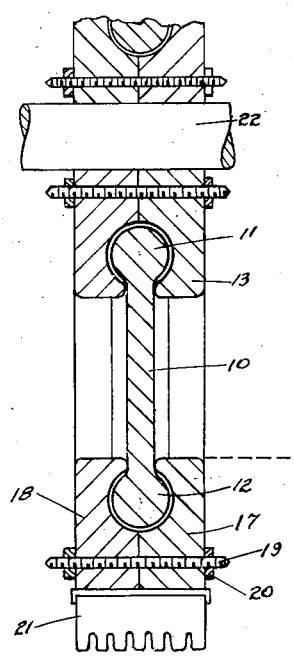
Fig. 2 is a view similar to Fig. 1 but showing the web in tension with the rim applied.

The inner members 13, 14 having been attached to the inner edge 11 of the web, as just described, the web in its unstretched condition will be as shown in Fig. 1. Now if the web is tensioned radially, that is to say uniformly stretched outwardly from the member 13, 14, hereinafter sometimes termed the "hub," the outer diameter of the web will be expanded to the position shown in Fig. 2. This can be accomplished by means hereinafter described, and while the body portion of the web 10 is held in expanded position, as shown in Fig. 2, the rigid annular member comprised of the parts 17 and 18 (which may be similar to the parts 13, 14 of the inner member just described) is applied to the outer edge 12 of the web and is secured thereto by means of a plurality of bolts and nuts 19, 20, or in any other suitable manner.

When the tensioning means is removed from the web, the resultant article of manufacture comprises the inner rigid annular member or hub 13, 14, the stretched or radially tensioned web 10 and the outer rigid annular members 17, 18.

Such an article when used, for example as a wheel, may be equipped with any suitable form of tire, such as shown at 21 which is secured to the outer member 17, 18 hereinafter sometimes termed the "rim."

The hub 13, 14 is attached to or mounted upon a shaft 22 and the result is a wheel in which the weight is supported by stretched rubber, or similar elastic material, at all times, thereby utilizing the elastic properties of the material forming the web in a structure involving a minimum of weight, and which is adapted to absorb vibrations and shocks, which is silent in operation and which may be adapted to meet practically any operating condition by varying the thickness, diameter, composition and tension of the web.

The rubber web, as described, permits in many cases the use of solid instead of pneumatic tires as it has an inherent resiliency not found in other types of wheels where solid tires are employed.

Figure 3 shows an apparatus that may be used to produce the article of manufacture described in connection with the preceding figures.

The figure diagrammatically illustrates a hydraulic device in which there is an annular table 23 having a plurality of radial inverted T-shaped slots 24 therein in which slide radially a plurality of gripping members 25, 26 which may be secured together by bolts 27 to grasp a work flange 28 forming the extreme outer edge of the web 10.

The gripping members 25, 26 are pivotally connected in any suitable manner—such as by the pins 29 passing through upstanding ears on said members—to a plurality of arms 30, the upper ends of which are pivotally connected by pins 31 to ears 32 depending from a member 33, secured to a shaft 34 connected to the piston of the hydraulic or other pressure cylinder 36.

Any suitable number of the gripping members can be used depending on the outer diameter of the web to be tensioned, the gripping members being clamped to the outer periphery of the web.

If the cylinder 36 is operated, member 33 moves downward and the gripping members will be forced outward radially. As the inner hub 13, 14 is held in the center of the device by shaft 34 which slides through the hub, the body of the web 10 will be radially stretched or tensioned outwardly. The outer enlarged edge 12 of the web will be pulled outwardly until it lies between the outer rigid members 17, 18, which have been placed above and below the web before stretching the same; and referring to Fig. 5, when the web is sufficiently stretched so that the outer edge 12 lies between said members 17, 18, bolts and nuts 19, 20 may be applied thereto, thereby clamping the web in its expanded or tensioned position between the hub and the rim.

The neck 28a, between the work flange 28 and the enlarged portion 12 of the web, may now be cut off flush with the outer peripheries of the members 17, 18. The finished article is removed from the device, Fig. 3, in a manner that will be obvious.

In Fig. 6, is shown a diagrammatic view of an alternate form of apparatus that can be used to practice the method herein described of tensioning the web. Here there is a revolvable shaft 36 to which is secured the hub 13, 14, previously described so that the hub and its associated web 10 revolves with the shaft.

Also carried on the shaft to rotate therewith, (but free to move laterally along said shaft) is a pair of frames 37, 37 which support at their outward extremities the rim members 17, 18. Members 37 are provided with any suitable locking means such as the spring pressed latches 38, which are free to ride over the catches 39 so that when the members 37 are brought together laterally they will be held locked together. The spring supports 37a are fixed to shaft 36 to revolve therewith but do not move therealong.

If the assembly shown in Fig. 6 is rotated with the members 37 initially held apart by means of the springs 40, (supported on the supports 37a) the web 10 is free to expand outwardly due to centrifugal force until the outer edge 12 thereof moves from the position shown in solid lines to that shown in dotted lines, and when it reaches the latter position, and while still in motion, if pressure is applied to the whole assembly in the direction of the arrows 40, the members 37 will close carrying with them the parts 17, 18 of the rim, the locking means 38, 39 will operate and the outer rim portions will be thereby held together on the edge 12 of the web.

The pins 41 may now be removed from the device and the bolts 19 may be applied to the rim members 17, 18 to hold same on the edge 12 of the web 10 which is held in expanded position between the hub and the web.

It will be obvious that for heavy webs the hydraulic arrangement shown in Fig. 3 is more suitable than for light webs for which the machine shown in Fig. 6 can be used.

Figure 8:
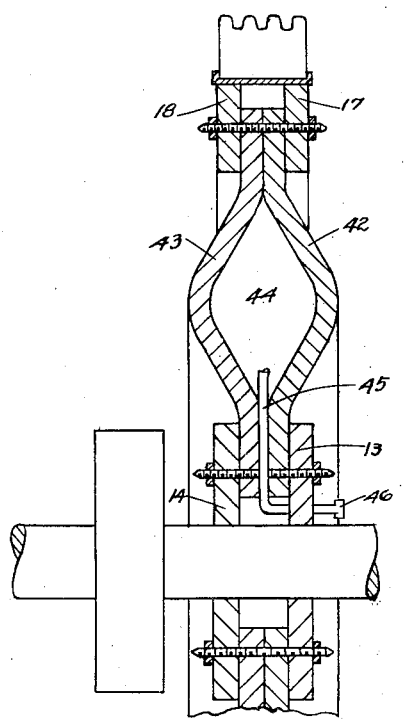
Fig. 8 is a view partly in section of an alternate form of construction of the article of manufacture and Fig. 9 is a view partly in section of an alternate form of construction of the article of manufacture.

Referring to Fig. 8, showing an alternate form of construction in which the web is tensioned between the hub and the rim, it will be seen that here the web may be made of two annular members 42, 43, which, when placed together at their inner and outer peripheries, as shown, provide an air chamber 44 therebetween. The valve stem 45 extends inwardly and then upwardly to provide an air inlet 46 which is equipped with the usual tire valve, so that the chamber 44 can be inflated, thereby placing the annular side walls of the web lying between the hub and the rim, under tension.

Obviously, the double walled arrangement shown in Fig. 8, can be assembled with the side walls under tension as taught in connection with Figs. 3 and 6, so that the side walls of the web will be under an initial tension before air is applied to the chamber 44. This chamber, therefore, affords an additional means of tensioning the web which on occasion may be adjusted by varying the degree of air pressure in chamber 44 in order to adapt the device to a given set of operating conditions.

Figure 9:
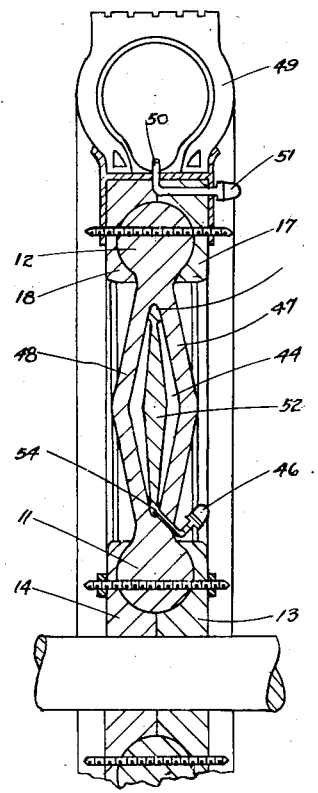

Figure 9 shows an alternate form of construction of the double walled web, as described in connection with Fig. 8. Here the chamber 44 is formed between the side walls 47, and 48 which are integral with the inner and outer edges 11 and 12 of the web. In other words, the web is made in one piece with an air pocket 44 therein.

In this embodiment of the invention the air valve 46 is preferably brought out through one side of the web, as shown, instead of extending down into the hub, and if a pneumatic tire, as shown at 49, is employed the air tube 50 and the air valve 51 for same may be brought out through one of the rim members such as 17.

It will be understood that no attempt has been made to show the details of the hub construction and how it may be attached to a shaft or otherwise supported, nor has any attempt been made to show how the tires 21 and 49 may be attached to the rims. Any suitable construction may be employed.

While two methods of tensioning the web have been described, it will be understood that the method herein disclosed is not limited to the employment of these two means or any other specific means. For example, if the web is frozen while under expansion by any suitable method of refrigeration, it is possible to attach the hub and rim thereto while the web is frozen. When the web is removed from the refrigerated environment it absorbs heat from the atmosphere and will automatically tension itself between the hub and the rim.

As the procedure incident to cooling stretched material, such as rubber, is well known, it is sufficient to point out, as above, that a machine like that shown in Fig. 3 may be employed to merely tension the rubber web, which is then frozen while under tension and while held at low temperature the hub and rim may be attached thereto. The web is then permitted to assume room temperature.

In the case of the wheels shown in Figs. 8 and 9 it may be desirable for some applications to make the side walls of the web so thin that in case the air chamber 44 becomes deflated the wheels would have a tendency to collapse. This can be avoided by placing in the air chamber a suitable metal or plastic member 52 which does not carry any load when the chamber 44 is properly inflated, but which does prevent the collapse of the web in case the chamber is deflated, for in the latter event the inner and outer edges of the member 52 will engage the adjacent walls of the chamber as indicated at 53, 54 and serve as a temporary support preventing collapse of the web.

I claim:

1. A wheel having a hub and a rim, and an annular resilient member having a web portion and inner and outer rim portions of greater cross-section than said web portion secured to said hub and rim, said web portion being held in tension between said rim portions and serving as the sole support for said rim.

2. A wheel having a hub and a rim, an annular resilient member having a web portion with an annular air chamber therein, means for attaching the peripheries of said member to said hub and rim, and a valved member forming a conduit communicating with said chamber whereby same may be filled to tension the web portion of said member.

3. A wheel having a hub and a rim, a pair of annular members forming a web and secured at their peripheries to said hub and rim and forming an annular air chamber spaced apart between said hub and rim, and a valved member forming a conduit communicating with said chamber whereby same may be filled to tension the walls of said web.

4. A wheel comprising a pair of members forming a hub, an annular resilient web having its inner edge clamped between said members, a pair of members forming a rim secured to the outer edge of said web and embracing the same, said web being in tension between said hub and rim.

PROSPER E. CHOLET.

REFERENCES CITED

The following references are of record in the file of this patent:

UNITED STATES PATENTS

| Number | Name | Date |
| --- | --- | --- |
| 1,446,922 | Morse | Feb. 27, 1923 |
| 1,527,037 | Erickson | Feb. 17, 1925 |
| 1,588,481 | Lord | June 15, 1926 |
| 1,661,643 | Waddell | Mar. 6, 1928 |
| 1,717,548 | Berg | June 18, 1929 |
| 1,730,559 | Carnahan | Oct. 8, 1929 |
| 2,022,217 | Rimailho | Nov. 26, 1935 |